United States Patent Office 3,318,953
Patented May 9, 1967

---

3,318,953
ORGANYL MERCAPTOALKYL AMIDE
COMPOUNDS AND PROCESS
Herbert L. Wehrmeister, Terre Haute, Ind., assignor to Commercial Solvents Corporation, a corporation of Maryland
No Drawing. Filed May 2, 1963, Ser. No. 277,452
19 Claims. (Cl. 260—558)

This invention relates to novel organylmercaptoalkyl products and their preparation. These novel products are useful as antioxidants for rubber and resins, as lubricants, insecticides and intermediates.

Novel amide products provided in accordance with the present invention correspond to the formula

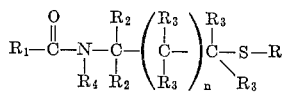

wherein R can be a hydrocarbon, e.g. substituted or unsubstituted alkyl or aryl, radical generally containing from 1 to 10 or 15 carbon atoms. The alkyl radicals include those derived from straight chain alkanes, for instance methyl, ethyl, pentyl, decyl and dodecyl, and the aryl radicals include mono-ring aromatics such as phenyl and halophenyl, e.g. chlorophenyl.

$R_1$ can be a hydrocarbon, e.g. substituted or unsubstituted alkyl or aryl, radical, preferably those containing from 1 to 20 carbon atoms. The alkyl radicals can be substituted such as aralkyl, e.g. phenylmethyl. Included among the aryl radicals are the mono-ring aromatics such as phenyl and alkaryl, e.g. ethyl phenyl.

$R_2$ can be hydrogen and a hydrocarbon, e.g. substituted or unsubstituted alkyl or aryl, radical, preferably those containing from about 1 to 15 carbon atoms. Included among the alkyl radicals are those derived from alkanes, e.g. lower alkanes such as methyl, ethyl and hydroxyalkyls, e.g. hydroxymethyl and hydroxyethyl. Included among the substituted alkyl radicals are the alkylmercaptoalkyl or arylmercaptoalkyl substituted radicals such as phenylmercaptomethyl and ethylmercaptomethyl radicals. Included among the aryl radicals are the mono-ring aromatics such as phenyl. $R_3$ can be hydrogen or hydrocarbon such as alkyl, e.g. lower alkyl, and $n$ can be 0 to 1. $R_4$ can be hydrogen and substituted or unsubstituted hydrocarbon, e.g. alkyl radicals, preferably those containing from about 1 to 15 carbon atoms. Included among the alkyl radicals are the lower alkyls such as methyl and ethyl, and the substituted alkyl, e.g. lower hydroxyalkyls such as hydroxymethyl and hydroxyethyl, and arylmercaptoalkyl, e.g. phenylmercaptoethyl, radicals. The $R_2$ radicals can be the same or different as is also true for the $R_3$ radicals.

The organylmercaptoalkyl amides can be prepared in high yields in accordance with the present invention by reacting an amino alcohol corresponding to the formula

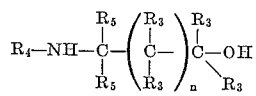

wherein $R_5$ is selected from the group consisting of hydrogen, alkyl and aryl, and $R_3$, $R_4$ and $n$ have the same meaning set forth above, with a monocarboxylic acid corresponding to the formula

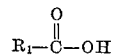

wherein $R_1$ has the same meaning set forth above, and with an organic thiol compound corresponding to the formula

R—SH wherein R also has the same meaning set forth above. $R_5$ can be substituted or unsubstituted alkyl or aryl radicals, pheferably those containing from about 1 to 15 carbon atoms. Included among the alkyls are the lower alkyls such as methyl and ethyl, and the substituted alkyls, such as methyl and ethyl, and the substituted alkyls, e.g. hydroxyalkyls such as hydroxymethyl and hydroxyethyl. Included among the aryl radicals are the mono-ring aromatics, e.g. phenyl and chlorophenyl. When $R_5$ is hydroxyalkyl and a sufficient amount of organic thiol is present during the reaction, an organylmercapto substituent can replace the hydroxy substituent to provide an organylmercaptoalkyl radical for $R_2$ in the resulting product.

Among the amino alcohols suitable in this invention are those with the amino and/or hydroxyl groups on primary, secondary and tertiary carbon atoms. The amino alcohols include the polyols such as amino diols and amino triols as well as the monohydroxy compounds. Exemplary amino alcohols include 2-amino-1-ethanol; 2-amino-1,1-dimethyl-1-ethanol; 2 - amino - 2 - phenyl - 1-ethanol; 2-amino-2-methyl-1-propanol; 3-amino-1-propanol; 2-(methylamino)ethanol; 2-amino-1-propanol; 1-amino-2-propanol; as well as polyol amines, e.g. amino diols and amino triols such as 2-amino-2-methyl-1,3-propanediol; diethanolamine and tris(hydroxymethyl)aminomethane. The amino alcohols 4-amino-1-butanol and dimethylaminoethanol were found to be unsatisfactory.

Advantageously, the monocarboxylic aliphatic or aromatic, acid may be for instance, acetic, propionic, n-butyric, n-valeric, caproic, heptoic, capric, lauric, palmitic, undecylic, myristic, stearic, oleic, nondecylic, arachidic, octadecodienoic, benzoic, phenylacetic, toluic, ethylbenzoic, halogenated benzoic acids such as chlorobenzoic acid, and the like. Suitable organic thiols include benzenethiol, p-chlorobenzenethiol and dodecanethiol.

The reaction product of an organic thiol, benzenethiol for instance, with an amino alcohol and monocarboxylic acid such as 2-amino-2-methyl-1,3-propanediol and propionic acid, respectively, may in some instances involve the formation of compounds having several organyl-mercapto groups when a sufficient amount of thiol is present. For instance, if the amino alcohol is a monohydroxy compound, it can advantageously be employed on a mole per mole basis with the organic thiol to substitute the sole hydroxyl group with an organylmercapto radical. If the amino alcohol is a diol, it can be advantageously employed in a molar ratio of 1 mole of diol to 1 to 2 moles of organic thiol to substitute either one or both of the hydroxyl groups with an organylmercapto radical. Similarly, if the amino alcohol is a triol, it can be advantageously employed in a molar ratio of 1 mole of triol to 1 to 3 moles of organic thiol to substitute either one, two or all three of the hydroxyl groups with an organylmercapto radical. Thus, generally the amount of the organic thiol employed with the amino alcohol depends upon the particular reactants used and the particular reaction product desired, but usually is in a molar ratio of 1 to 3 moles of thiol for each mole of the amino alcohol. Reaction occurs until all of the thiol is consumed or all of the hydroxyl groups are replaced by the organylmercapto group. A representative scheme for such a reaction may be as follows:

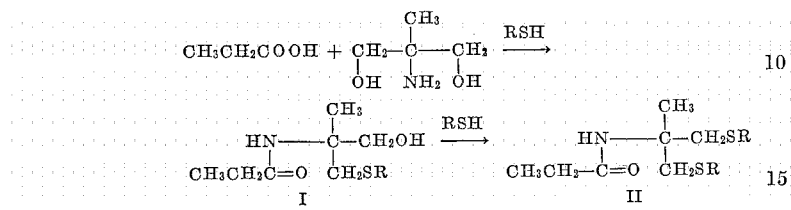

The amount of monocarboxylic acid employed with the amino alcohol is advantageously in a molar ratio of 1 to 1.

This repetitive reaction provided by the method of this invention makes possible the preparation in good yields of a variety of novel products. It can also involve the formation of oxazoline.

The method of the present invention for producing the novel organylmercaptoalkyl amides can be carried out at temperatures sufficient to react the amino alcohol, the monocarboxylic acid and the thiol, generally from about 80 to 220° C., preferably from about 130 to 205° C. An inert atmosphere, e.g. nitrogen atmosphere, can be employed and the reaction mixture can be heated to a reflux state, where appropriate, to effect the reaction of the amino alcohol, monocarboxylic acid and thiol. The reaction is conducted for a period of time sufficient to produce the desired organylmercaptoalkyl amide and this can vary from about 1 to 18 hours and preferably 2 to 16 hours. Depending upon the particular amide compound produced, it may be recovered either by distillation or recrystallization procedures.

The reaction can also be conducted in the presence of solvents, for example, hydrocarbons such as hexane, octane, benzene, xylene, etc.; ethers such as dioxane; halogenated hydrocarbons, etc. Some of the solvents can also be advantageously used as azeotropic agents to aid in the removal of water resulting from the reaction.

Another aspect of the present invention is the provision of amine compounds, compounds A, having the formula

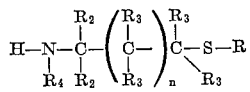

wherein R, $R_2$, $R_3$, $R_4$ and $n$ have the same meaning set forth above. In accordance with this aspect of the present invention, these compounds can be prepared by the hydrolysis of the novel organylmercaptoalky amides described above and by the hydrolysis of the novel oxazolines, described below. Preferably at least one of $R_3$ is hydrogen or substituted alkyl, e.g. hydroxyalkyl. This hydrolysis is advantageously acid catalyzed, preferably with aqueous mineral acid catalysts, e.g. HCl, $H_3PO_4$ and $H_2SO_4$, under hydrolysis conditions including the heating of the amide, for instance to reflux conditions, for instance to a temperature of about 100 to 125° C., in the presence of a mineral acid for a period of time sufficient to effect the hydrolysis, for instance for a period of time ranging from about 0.1 to 70 hours. To advantageously recover the amines, the reaction mixture can be made alkaline, for instance with NaOH or $Na_2CO_3$, and the amine extracted with a hydrocarbon, e.g. benzene. The benzene extract can be distilled to yield the amine. A novel group of amine compounds produced by such hydrolysis correspond to the above formula except that when $n$ is 0, at least one of $R_2$, $R_3$ and $R_4$ is hydrocarbon.

Still another aspect of the present invention is the provision of oxazoline compounds having the formula

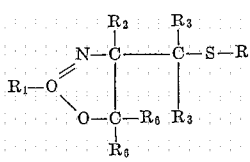

wherein R, $R_1$, $R_2$ and $R_3$ have the same meaning set forth above, and $R_6$ is hydrogen or alkyl containing from about 1 to 15 carbon atoms, e.g. lower alkyl such as methyl, ethyl, pentyl and hexyl, for instance. These compounds can be prepared simultaneously with the novel organylmercaptoalkyl amides by the same process and using the same reactants as those employed to prepare the novel amides except the amino alcohol must be one wherein one of the $R_5$ radicals of the amino alcohol is a lower alkyl radical with a hydroxy substituent located in a beta position relative to the nitrogen atom, for instance hydroxymethyl, 1-hydroxyethyl and 1-hydroxypentyl radicals. The novel oxazoline compounds can be hydrolyzed by the same procedure set forth for the hydrolysis of the novel amides to provide compounds having the formula for compounds A. A particularly unique group of organylmercapto-amino-alkanols produced by such hydrolysis correspond to the formula

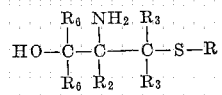

wherein R, $R_2$, $R_3$ and $R_6$ have the same meaning set forth above.

The following examples will serve to illustrate the invention, however, they are not intended to be limiting as to any specific materials, proportions or procedures described and it is intended to include all equivalents obvious to those skilled in the art within the scope of the invention.

*Example I*

N - (2 - phenylmercapto - 1-,1-dimethylethyl)propionamide was prepared, according to my invention, as follows:

A mixture of 45 g. of 2-amino-2-methyl-1-propanol, 37.4 g. of propionic acid, 55.5 g. of benzenethiol together with 50 ml. of benzene was heated under reflux with azeotropic removal of water. There was obtained 25 ml. of an aqueous phase in an 8-hour period. Temperatures ranging from 110 to 184° C. were employed. The higher temperatures were obtained by removing part of the benzene by distillation during the reaction. Extraction of the aqueous phase with benzene reduced its volume to 23 ml. Titration indicated the presence in the aqueous layer of 30 milliequivalents of an amine which corresponds to 3.8 g. of oxazoline. The total amount of water obtained was about 19 ml. compared to the theoretical 18 ml.

Distillation of the residue yielded 94.5 g. of the propionamide having a B.P. of 145 to 153/0.3 mm. for a 79 percent recovery. Recrystallization from hexane yielded a product with a M.P. of 47.5 to 48.5° C.

*Analysis.*—Calcd. for $C_{13}H_{19}NOS$; N, 5.90; S, 13.50. Found: N, 5.69; S, 13.68.

The infrared spectrum is consistent with the structure assigned.

*Example II*

N-(2-phenylmercaptoethyl)propionamide was prepared as follows:

A mixture of 61 g. (1 mole) of ethanolamine, 110 g. (1 mole) of benzenethiol, 74 g. (1 mole) of propionic acid and 50 ml. of benzene was heated at reflux with azetropic removal of water. There was collected 35.5 mls. of water over a 16 hour reflux period at temperatures of 134 to 202° C. The higher temperatures were obtained by removing part of the benzene by distillation during the reaction. Distillation yielded 185.6 g. of the propionamide having a B.P. of 125/0.7 to 173°/0.3 mm. for an 88% yield.

Analysis.—Calcd. for $C_{11}H_{15}NOS$: N, 6.69; S, 15.32. Found: N, 6.62; S, 14.02.

On recrystallization from hexane the product exhibited a melting point of 75 to 76° C.

Analysis.—Found: N, 6.34; S, 15.20. The infrared spectrum is consistent with the structure assigned.

Example III

N-(3-phenylmercaptopropyl)propionamide was prepared as follows:

A mixture of 75 g. of 3-amino-1-propanol, 110 g. of benzenethiol and 74 g. of propionic acid with 50 ml. of benzene was heated under reflux with azeotropic removal of water. There was collected 35 to 36 mls. of water over a 16 hour reflux period at temperatures of 122 to 216° C. The higher temperatures were obtained by removing part of the benzene by distillation during the reaction. Distillation yielded 199 g. of the propionamide having a B.P. of 139°/0.1 to 178°/0.2 mm. for an 89 percent yield.

Analysis.—Calcd. for $C_{12}H_{17}NOS$: N, 6.27; S, 14.35. Found: N, 6.52.

On recrystallization three times from a mixture of hexane and benzene the product exhibited a melting point of 66 to 67° C.

Analysis.—Found: N, 5.76; 6.19; S, 15.06; 14.18. The infrared spectrum is consistent with the structure assigned.

Example IV

N - [1,1 - bis(phenylmercaptomethyl)ethyl]propionamide was prepared as follows:

A mixture of half-mole quantities of 2-amino-2-methyl-1,3-propanediol, benzenethiol and propionic acid in 100 ml. of benzene was heated under reflux with azeotropic removal of water. There was collected 24 mls. of water in a 5 hour reflux period at temperatures of 95 to 202° C. The higher temperatures were obtained by removing part of the benzene by distillation during the reaction. Distillation of the residue yielded several fractions, one containing oxazoline, i.e. 2-ethyl-4-methyl-4-phenylmercaptomethyl - 2 - oxazoline, and a fraction of 47.8 g. at a B.P. of 207 to 221° C./0.1 mm. This fraction was identified as N-[1,1-bis(phenylmercaptomethyl)-ethyl]propionamide.

Analysis.—Calcd. for $C_{19}H_{22}NOS_2$ (M.W. 344.5): N, 4.07; S, 18.61. Found: N, 4.25; S, 18.16. Non-basic.

Thus the organylmercaptoalkyl amide can be produced in combination with oxazoline to provide a novel oxazoline product as described supra, for instance an arylmercaptoalkyl oxazoline.

Example V

N - [1,1 - bis(phenylmercaptomethyl)ethyl]propionamide was prepared as follows:

A mixture of 53 g. (0.5 mole) of 2-amino-2-methyl-1,3-propanediol, 110 g. (1.0 mole) of benzenethiol and 37 g. (0.5 mole) of propionic acid in 50 ml. of xylene was heated under reflux with azeotropic removal of water. There was collected 26.5 mls. of water in a 9.5 hour reflux period at temperatures of 149 to 165° C. The higher temperatures were obtained by removing part of the xylene by distillation during the reaction. The distillation yielded 97.6 g. of the propionamide having a B.P. of 215 to 224° C./0.1 mm. for a 57 percent recovery.

Analysis.—Found: N, 4.25; S, 18.23. The infrared spectrum is consistent with the structure assigned.

Example VI

N - [tris(phenylmercaptomethyl)methyl]propionamide was prepared as follows:

A mixture of 30.3 g. (0.25 mole) of tris(hydroxymethyl)aminomethane, 20 g. (0.27 mole) of propionic acid and 90 g. (0.82 mole) of benzenethiol with 50 ml. of xylene was heated under reflux with azeotropic removal of water. There was collected 16.2 mls. of water in a 5 hour reflux period at temperatures of 151 to 173° C. The residue was heated in a mixture of 2300 ml. of hexane and 500 ml. of benzene. The hot mixture was filtered to remove insoluble material. There was crystallized out 52.9 g. of the propionamide on cooling the filtrate. An additional 9.5 g. of crystals were recovered on concentrating and further cooling the mother liquor. The 62.4 g. of total product corresponds to a yield of 55%. The product was recrystallized four times to yield a material with a melting point of 122 to 123° C.

Analysis.—Calcd. for $C_{25}H_{27}NOS_3$: N, 3.09; S, 21.20. Found: N, 2.93; S, 20.49, 20.51. The infrared spectrum is consistent with the structure assigned.

Example VII

Essentially the same procedure used in Example I is employed except p-chlorobenzenethiol is substituted for benzenethiol to make N-(2-p-chlorophenylmercapto-1,1-dimethylethyl)propionamide.

Example VIII

Essentially the same procedure used in Example I is employed except that oleic acid is substituted for propionic acid and p-chlorobenzenethiol is substituted for benzenethiol to make N-(2-p-chlorophenylmercapto-1,1-dimethylethyl)oleamide.

Example IX

Essentially the same procedure used in Example I is employed except that ethanethiol is substituted for benzenethiol to make N-(2-ethylmercapto-1,1-dimethylethyl)propionamide.

Example X

Essentially the same procedure used in Example I is employed except that 2-amino-1,1-dimethyl-1-ethanol is substituted for 2-amino-2-methyl-1-propanol to make N-(2-phenylmercapto-2,2-dimethylethyl)propionamide.

Example XI

Essentialy the same procedure used in Example I is employed except that 2-amino-2-phenyl-1-ethanol is substituted for 2-amino-2-methyl-1-propanol to make N-(2-phenylmercapto-1-phenylethyl)propionamide.

Example XII

Essentially the same procedure used in Example I is employed except that benzoic acid is substituted for propionic acid to make N-(2-phenylmercapto-1,1-dimethylethyl)benzamide.

Example XIII

Essentially the same procedure used in Example I is employed except that 2-amino-2-phenyl-1-propanol is substituted for 2-amino-2-methyl-1-propanol to make N-(2-phenylmercapto-1-methyl-1-phenyl)propionamide.

Examples XIV to XX

The N-(phenylmercaptoalkyl)amides corresponding to the formula set forth below for each of these examples were prepared by the following method. A mixture of molar quantities of benzenethiol, the amino alcohol and the carboxylic acid in 50 ml. of benzene was heated at reflux under an 18-inch Vigreux column with azeotropic removal of water. Reflux periods ranged from 6 to 14 hours at pot temperatures of 134 to 202°. Removal of part of the benzene from the separator was necessary to obtain the higher pot temperatures. After the reactions were essentially complete, the mixtures were distilled through an 18-inch Vigreux column. The distilled products, generally of better than 90% purity, were recrystallized to a constant melting point from either hexane, hexane-benzene, or ether. The results are summarized in Table I. The compounds produced in these examples are of the formula $$R_1-\overset{O}{\underset{\|}{C}}-\overset{R_4}{\underset{|}{N}}-\overset{R_2}{\underset{|}{\underset{R_2'}{C}}}-\overset{R_3}{\underset{|}{\underset{H}{C}}}-S-C_6H_5$$

wherein the values for $R_1$, $R_2$, $R_2'$, $R_3$ and $R_4$ are set forth in the table for the respective examples.

of the amide in 100 ml. of concentrated hydrochloric acid is heated at reflux for 3 to 48 hours. Aqueous 50% sodium hydroxide solution (50 ml.) is added to the cooled hydrolysate and the alkaline mixture is extracted with three 100-ml. portions of benzene. The dried ($Na_2CO_3$ or $Na_2SO_4$) extract is distilled, finally at reduced pressure to yield the phenylmercaptoalkylamine. The results are summerized in Table II.

TABLE I

| Example | $R_1$ | $R_4$ | $R_2$ | $R_2'$ | $R_3$ | Yield,a percent | B.R.,a °C. (mm.) | M.P.,b °C. | N, percent b Calcd. | N, percent b Found | S, percent b Calcd. | S, percent b Found |
|---|---|---|---|---|---|---|---|---|---|---|---|---|
| XIV | $C_2H_5$ | H | H | H | H | 88 | 125–173(0.3) | 76–77 | 6.69 | 6.34 | 15.32 | 15.20 |
| XV | $CH_3$ | H | H | H | $CH_3$ | c 80 | 150(0.25)–140(0.22) | 45–46 | 6.69 | 6.45 | 15.32 | 16.45 |
|  |  |  |  |  |  | 50 | 152–153.5(0.08) |  |  |  |  |  |
| XVI | $CH_3$ | H | H | $CH_3$ | H | 80 | 140–150(0.2) | 88.5–89.5 | 6.69 | 6.36 | 15.32 | 15.84 |
| XVII | $C_2H_5$ | H | $CH_3$ | $CH_3$ | H | 80 | 145–153(0.3) | 47.5–48.5 | 5.90 | 5.47 | 13.50 | 12.85 |
| XVIII | $C_6H_5$ | H | $CH_3$ | $CH_3$ | H | e 57 |  | 76–77 | 4.91 | 4.78 |  |  |
| XIX | $C_2H_5$ | H | $C_2H_5$ | H | $CH_3$ | 91 | 144–150(0.1) | 53–54 | 5.57 | 5.45 | 12.75 | 13.29 |
| XX | $C_2H_5$ | $CH_3$ | H | H | H | 88 | g 137–148(0.2) |  | 6.27 | 6.15 | 14.35 | 14.71 |
|  |  |  |  |  |  |  | 154–158(0.05) |  |  |  |  |  | a Of distilled material.
b Of recrystallized material.
c Of crude material which could not be crystallized. Redistillation yielded material which could be recrystallized.
e The reaction mixture was crystallized directly from hexane.
g An oil which could not be crystallized. Redistillation through a packed column also yielded an oil. The analyses are of the redistilled oil.

*Example XXI*

N,N - bis-(2 - phenylmercaptoethyl)propionamide was prepared by the following procedure. A mixture of 52.5 g. (0.5 mole) of diethanolamine, 110 g. (1.0 mole) of benzenethiol and 37 g. (0.5 mole) of propionic acid in 50 ml. of benzene was heated at 142 to 174° for 7 hours with azeotropic removal of 27.4 ml. of water. Distillation yielded 154.6 g. (89%) of product, B.P. 218° (0.4 mm.) to 239° (0.5 mm.).

The amine compounds produced in these examples are of the formula $$H-\overset{R_2}{\underset{|}{\underset{R_4}{N}}}-\overset{H}{\underset{|}{\underset{R_2'}{C}}}-\overset{}{\underset{|}{\underset{R_3}{C}}}-S-C_6H_5$$

wherein the values for $R_2$, $R_2'$, $R_3$ and $R_4$ are set forth in Table II below for the given examples. The starting materials were the corresponding propionamides.

TABLE II

| Example | $R_3$ | $R_2$ | $R_2'$ | $R_4$ | Yield, percent | B.P., °C. (mm.) | N, percent Calcd. | N, percent Found | S. percent Calcd. | S. percent Found | N. Eq. Calcd. | N. Eq. Found |
|---|---|---|---|---|---|---|---|---|---|---|---|---|
| XXIII | H | H | H | H | 83 | 84–86(0.2) | 9.14 | 9.05 | 20.93 | 20.29 / 19.91 | 153.2 | 154.6 |
| XXIV | $CH_3$ | H | H | H | 78 | a 111–113(4.0) | 8.37 | 8.89 | 19.16 | 19.73 | 167.3 | 168.3 |
| XXV | H | $CH_3$ | H | H | 86 | b 112–114(4.0) | 8.37 | 8.77 | 19.16 | 19.64 | 167.3 | 168.1 |
| XXVI | $CH_3$ | H | $C_2H_5$ | H | c 22 | 124–127(4.0) | 7.17 | 7.17 / 7.26 | 16.42 | 16.88 | 195.3 | 196.3 |
| XXVII | H | H | H | $CH_3$ | 82 | 112–112.5(4.0) | 8.37 | 8.56 | 19.16 | 19.76 | 167.3 | 168.4 | a Benzamide derivative, m.p. 86–87°. Calcd. for $C_{16}H_{17}NOS$: N, 5.16; S, 11.81. Found: N, 5.03; S, 11.73.
b Benzamide derivative, m.p. 128–129°. Calcd. for $C_{16}H_{17}NOS$: N, 5.16; S, 11.81. Found: N, 4.88; S, 11.72.
c Approximately 60% of the amide was recovered.

*Analysis.*—Calcd. for $C_{19}H_{23}NOS_2$: N, 4.05; S, 18.56. Found: N, 4.26; S, 19.35.

*Example XXII*

N - methyl-N-(2-dodecylmercaptoethyl)acetamide was prepared by the following procedure. A stirred mixture of half-molar quantities of dodecanethiol, 2-(methylamino)ethanol and acetic acid in 50 ml. of benzene was heated at 166 to 197° for 8 hours with azeotropic removal of 16 ml. of water. Distillation through an 18-inch Vigreux column yielded 63 g. of crude material, B.P., 118 to 205° (0.5 mm.). Redistillation yielded 53.4 g. (35%) of material, B.P., 165 to 174° (0.1 mm.).

*Analysis.*—Calcd. for $C_{17}H_{35}NOS$: N, 4.65; S, 10.63. Found: N, 5.16; S, 10.09.

*Examples XXIII to XXVII*

HYDROLYSIS OF ORGANYLMERCAPTOALKYL AMIDES TO ORGANYLMERCAPTOALKYL AMINES

The phenylmercaptoalkyl amides were hydrolyzed by the following general procedure. A mixture of 0.3 mole

*Example XXVIII*

3-phenylmercaptopropylamine was prepared by the hydrolysis of 44.7 g. of N-(3-phenylmercaptopropyl)propionamide according to the procedure described in Examples XXIII to XXVII to yield 25.5 g. of product, B.P. 125 to 126° (4.0 mm.).

*Analysis.*—Calcd. for $C_9H_{13}NS$: N, 8.37; S, 19.16; N. Eq., 167.3. Found: N, 8.53; S, 19.36; N. Eq., 169.9.

*Example XXIX*

Bis(2-phenylmercaptoethyl)amine was prepared by the following procedure. A mixture of 35 g. of N,N-bis(2-phenylmercaptoethyl)propionamide and 100 ml. of concentrated hydrochloric acid was heated at reflux for 34 hours. To the cooled hydrolysate was added 100 ml. of water and 100 ml. of 50% sodium hydroxide. The mixture was extracted with three 100-ml. portions of benzene, and the extract was distilled.

There was obtained 20.2 g. (70%) of product, B.P. 187–193° (0.05 mm.).

Analysis.—Calcd. for $C_{16}H_{19}NS_2$: N, 4.84; S, 22.16; N, Eq., 289.4. Found: N, 5.03; S, 21.98; N. Eq., 290.9.

*Example XXX*

Fifty grams of N-(2-phenylmercapto-1,1-dimethylethyl)propionamide was heated at reflux in 100 ml. of concentrated HCl and 90 ml. of glacial acetic acid for 16 hours. The lower layer of the mixture after hydrolysis was separated and made alkaline with 125 ml. of 50% NaOH. The alkaline mixture was extracted with $3 \times 100$ ml. of benzene and the dried ($K_2CO_3$) extract was distilled and redistilled. There was obtained 3.6 g. of material, B.P., 114–115°/4.0 mm., 2-phenylmercapto-1,1-dimethylethylamine.

*Example XXXI*

Hydrolysis of 2-ethyl-4-methyl-4-phenylmercaptomethyl-2-oxazoline to 3-phenylmercapto-2-amino-2-methyl-1-propanol.

2-ethyl-4-methyl-4-phenylmercaptomethyl-2-oxazoline was hydrolyzed by heating 20.3 g. with 40 ml. of 6 N-hydrochloric acid at reflux for 3 hours. To the cooled hydrolysate was added 25 ml. of 50% sodium hydroxide solution, and the resulting mixture was extracted with two 50-ml. portions of benzene. Distillation yielded 14.3 g. (84%) of product, B.P. 125–127° (0.2 mm.).

Analysis.—Calcd. for $C_{10}H_{15}NOS$: N, 7.10; S, 16.25; N. Eq., 197.3. Found: N, 6.99; S, 15.70; N. Eq., 200.5.

It is claimed:

1. A compound of the formula

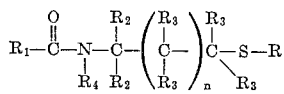

wherein R is selected from the group consisting of alkyl having from about 1 to 15 carbon atoms and mono-ring aryl; $R_1$ is selected from the group consisting of alkyl having from about 1 to 20 carbon atoms and mono-ring aryl; $R_2$ is mono-ring arylmercaptoalkyl having up to 15 carbon atoms; $R_3$ is selected from the group consisting of hydrogen and lower alkyl; $R_4$ is selected from the group consisting of hydrogen and alkyl having from about 1 to 15 carbon atoms; and n is equal to 0 to 1.

2. A compound of the formula:

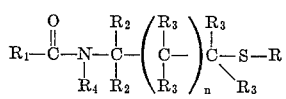

wherein R is monocyclic aryl of about 1 to 15 carbon atoms; $R_1$ is an alkyl of about 1 to 20 carbon atoms; $R_2$ is selected from the group consisting of hydrogen, alkyl of about 1 to 15 carbon atoms and monocyclic aryl of about 1 to 15 carbon atoms; $R_3$ is selected from the group consisting of hydrogen and lower alkyl; $R_4$ is hydrogen; and n is equal to 0 to 1.

3. A compound of the formula:

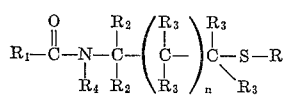

wherein R is monocyclic aryl of about 1 to 15 carbon atoms; $R_1$ is alkyl of about 1 to 20 carbon atoms; $R_2$ is alkyl of about 1 to 15 carbon atoms; $R_3$ is hydrogen; $R_4$ is hydrogen; and n is equal to 0.

4. A compound of the formula:

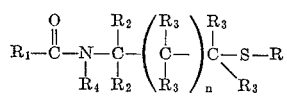

wherein R is monocyclic aryl of about 1 to 15 carbon atoms; $R_1$ is alkyl of about 1 to 20 carbon atoms; $R_2$ is monocyclicaryl mercaptoalkyl having up to 15 carbon atoms; $R_3$ is hydrogen; $R_4$ is hydrogen; and n is equal to 0.

5. The compound of claim 2 where $R_2$ and $R_3$ are hydrogen and n is equal to 1.

6. The compound of claim 3 wherein R is phenyl.
7. The compound of claim 4 wherein R is phenyl.
8. The compound of claim 5 wherein R is phenyl.
9. A compound of the formula:

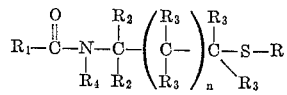

wherein R is monocyclic aryl of about 1 to 15 carbon atoms; $R_1$ is alkyl of about 1 to 20 carbon atoms; $R_2$ is selected from the group consisting of hydrogen, alkyl of about 1 to 15 carbon atoms and monocyclic aryl of about 1 to 15 carbon atoms; $R_3$ is selected from the group consisting of hydrogen and lower alkyl, $R_4$ is alkyl of about 1 to 15 carbon atoms and n is equal to 0 to 1.

10. A compound of the formula:

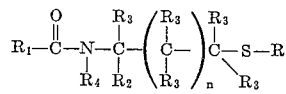

wherein R is monocyclic aryl of about 1 to 15 carbon atoms; $R_1$ is alkyl of about 1 to 20 carbon atoms; $R_2$ is selected from the group consisting of hydrogen, alkyl of about 1 to 15 carbon atoms and monocyclic aryl of about 1 to 15 carbon atoms; $R_3$ is selected from the group consisting of hydrogen and lower alkyl, $R_4$ is monocyclic-aryl-mercaptoalkyl having up to 15 carbon atoms; and n is equal to 0 to 1.

11. A compound of the formula:

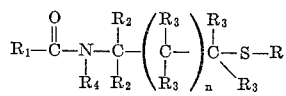

wherein R is alkyl of about 1 to 15 carbon atoms; $R_1$ is alkyl of about 1 to 20 carbon atoms; $R_2$ is selected from the group consisting of hydrogen, alkyl of about 1 to 15 carbon atoms and monocyclic aryl of about 1 to 15 carbon atoms; $R_3$ is selected from the group consisting of hydrogen and lower alkyl; $R_4$ is alkyl of about 1 to 15 carbon atoms; and n is equal to 0 to 1.

12. A compound of the formula:

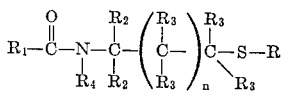

wherein R is selected from the group consisting of alkyl of about 1 to 15 carbon atoms and monocyclic aryl of about 1 to 15 carbon atoms; $R_1$ is selected from the group consisting of alkyl of about 1 to 20 carbon atoms and monocyclic aryl of about 1 to 20 carbon atoms; $R_2$ is monocyclic aryl of about 1 to 15 carbon atoms; $R_3$ is selected from the group consisting of hydrogen and lower alkyl; $R_4$ is selected from the group consisting of hydrogen and alkyl of about 1 to 15 carbon atoms; and n is equal to 0 to 1.

13. A compound of the formula:

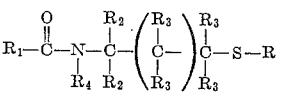

wherein R is selected from the group consisting of alkyl having from about 1 to 15 carbon atoms and mono-ring aryl; $R_1$ is selected from the group consisting of alkyl having from about 1 to 20 carbon atoms and mono-ring aryl; $R_2$ is selected from the group consisting of hydrogen, alkyl having from about 1 to 15 carbon atoms and mono-ring aryl; $R_3$ is selected from the group consisting of hydrogen and lower alkyl; $R_4$ is mono-ring-arylmercaptoalkyl having up to 15 carbon atoms; and n is equal to 0 to 1.

14. N, N-bis(2-phenylmercaptoethyl)propionamide.
15. N-methyl-N-(2-dodecylmercaptoethyl)acetamide.
16. N-(2-phenylmercaptopropyl)propionamide.
17. N - [1,1-bis(phenylmercaptomethyl)ethyl]propionamide.

18. N - [tris(phenylmercaptomethyl)methyl]propionamide.

19. A method for preparing an organylmercaptoalkyl amide compounds of the formula

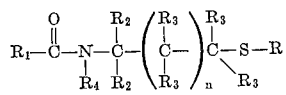

wherein R is selected from the group consisting of alkyl having from about 1 to 15 carbon atoms and mono-ring aryl; $R_1$ is selected from the group consisting of alkyl having from about 1 to 20 carbon atoms and mono-ring aryl; $R_2$ is selected from the group consisting of hydrogen, alkyl having from about 1 to 15 carbon atoms and mono-ring aryl; $R_3$ is selected from the group consisting of hyrogen and lower alkyl; $R_4$ is selected from the group consisting of hydrogen and alkyl having from about 1 to 15 carbon atoms; and $n$ is equal to 0 to 1, the steps comprising reacting an amino alcohol having the formula

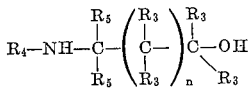

wherein $R_5$ is selected from the group consisting of hydrogen, alkyl having from about 1 to 15 carbon atoms and mono-ring aryl, and $R_3$, $R_4$ and $n$ have the same meaning set forth above, with a mono-carboxylic acid having the formula

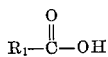

wherein $R_1$ has the same meaning set forth above and with a thiol compound having the formula

wherein R has the same meaning set forth above, under organylmercaptoalkyl amide-producing reaction conditions including a temperature of about 80 to 220° C. to produce an organylmercaptoalkyl amide.

References Cited by the Examiner

UNITED STATES PATENTS

| | | | |
|---|---|---|---|
| 2,358,786 | 9/1944 | Bogert | 260—583 |
| 2,463,942 | 3/1949 | Behrens et al. | 260—558 |
| 2,625,565 | 2/1951 | Snell et al. | 260—561 |
| 2,658,897 | 11/1953 | Hitchings et al. | 260—256.4 |
| 2,769,839 | 11/1956 | Finck | 260—570.5 |
| 2,773,899 | 12/1956 | Martin et al. | 260—562 |
| 2,828,339 | 3/1958 | Caldwell | 260—558 |
| 2,953,567 | 9/1960 | Hitchings et al. | 260—256.5 |
| 2,984,668 | 5/1961 | Kalm et al. | 260—307 |
| 3,008,984 | 11/1961 | Guest et al. | 260—307 |

OTHER REFERENCES

Chemical Abstracts, vol. 55, Subject Index A–Q (January-June 1961) page 11S (1962).

Conant et al.: "The Chemistry of Organic Compounds," 3rd Ed., page 342, New York, MacMillan, 1947.

Crane: "Jour. Chem. Soc." (London), 1947, pages 766–72.

Hellmann et al.: German application, 1,059,022, printed June 11, 1959.

Hitchings et al.: "Chemical Abstracts," vol. 55, page 4546 (1961).

Jaeger: German application 1,062,253, printed July 30, 1959.

WALTER A. MODANCE, *Primary Examiner.*
NICHOLAS RIZZO, JOHN D. RANDOLPH,
*Examiners.*
R. L. PRICE, NATALIE TROUSOF,
*Assistant Examiners.*